United States Patent [19]

Rich

[11] Patent Number: 5,104,170
[45] Date of Patent: Apr. 14, 1992

[54] AUTOMOBILE JACK AND WHEEL CHOCK SYSTEM

[75] Inventor: John J. Rich, Lansing, Mich.

[73] Assignee: Jackson Assembly Enterprises, Inc., Lansing, Mich.

[21] Appl. No.: 597,377

[22] Filed: Oct. 15, 1990

[51] Int. Cl.⁵ .......................... B60S 9/22; B60S 11/00
[52] U.S. Cl. ...................................... 296/1.1; 188/32; 224/42.42; 248/505
[58] Field of Search .......................... 296/1.1; 188/32; 224/42.11, 42.38, 42.39, 42.42, 42.45 R; 248/499, 500, 503, 505, 510; 410/30

[56] References Cited

U.S. PATENT DOCUMENTS

| | | | |
|---|---|---|---|
| 254,840 | 3/1882 | Perry | 248/505 X |
| 1,254,920 | 1/1918 | Mathias | 410/30 X |
| 1,429,921 | 9/1922 | Blakely | 188/32 |
| 1,812,781 | 6/1931 | Gibbs | 188/32 X |
| 1,837,657 | 12/1931 | Fedderman | 188/32 X |
| 2,461,248 | 2/1949 | Wright | 188/32 |
| 2,998,102 | 8/1961 | Deverich | 188/32 |
| 3,547,228 | 12/1970 | Wiley | 188/32 |
| 3,810,530 | 5/1974 | Jay | 188/32 |
| 4,711,325 | 12/1987 | Mountz | 188/32 |
| 4,838,512 | 6/1989 | Lisak et al. | 248/503 |

*Primary Examiner*—Dennis H. Pedder
*Attorney, Agent, or Firm*—Beaman & Beaman

[57] ABSTRACT

An automobile jack and wheel chocks assembly for automobiles wherein a jack and wheel chocks are stored in the vehicle as a concise spacing saving unit. The chocks include structure which receives and locates the jack, and the chocks are positioned in the vehicle by locating pins.

5 Claims, 1 Drawing Sheet

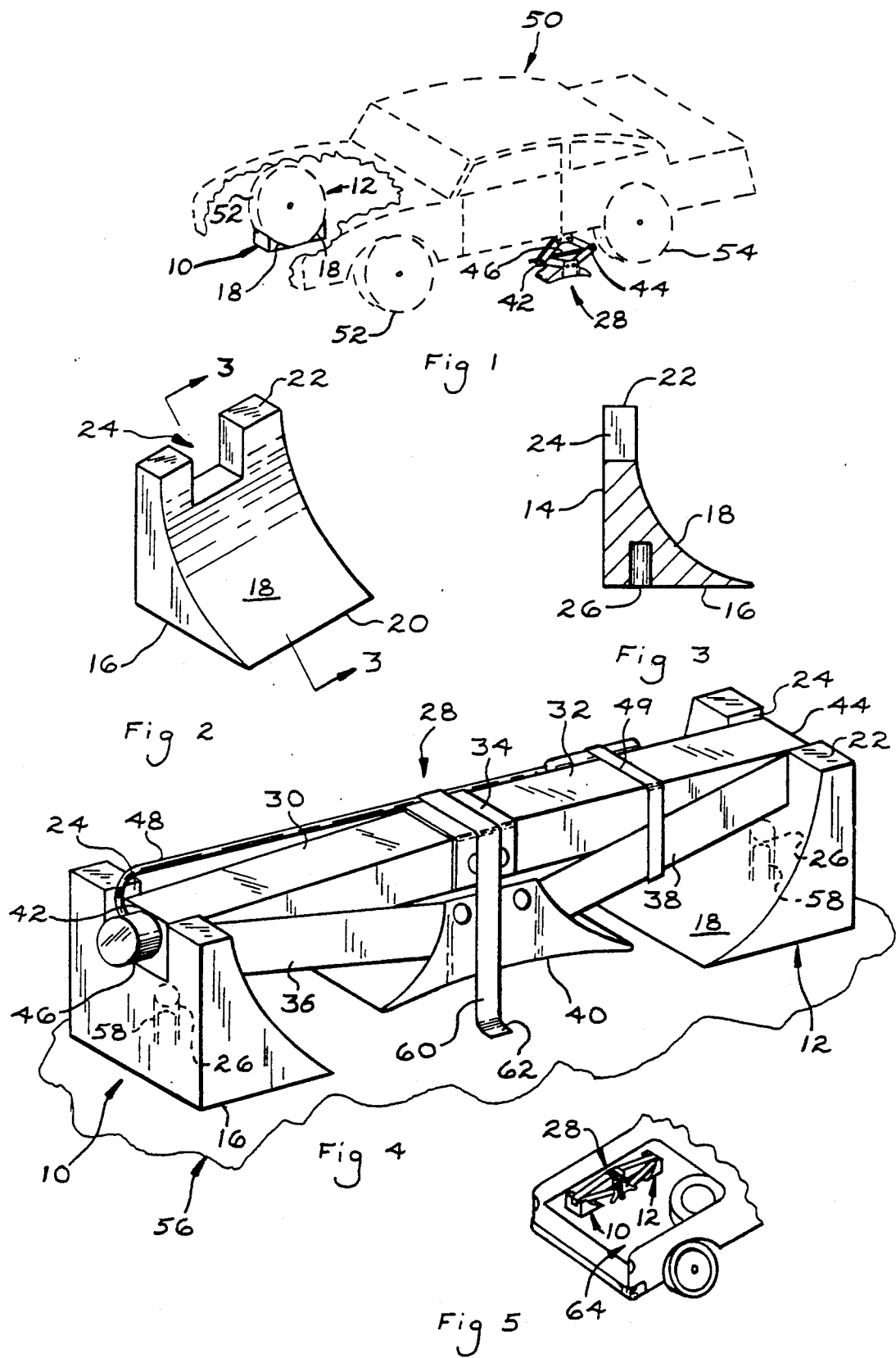

AUTOMOBILE JACK AND WHEEL CHOCK SYSTEM

BACKGROUND OF THE INVENTION

Jack systems are commonly stowed in vehicle's to provide a readily available jack when necessary for changing a tire or performing some other task which requires one end of the vehicle to be elevated. Such vehicle jacks are usually stowed in a compact manner in the trunk or rear end of a vehicle so as to occupy relatively little space. Straps or other types of retaining structure are utilized to secure the jack with respect to the vehicle. However, difficulty has been experienced in eliminating annoying noises and squeaks due to vibration as often the jacks are anchored in direct contact with the vehicle but are insufficiently secured due to the awkward configuration of the jack structure and accessories such as a handle for actuating the jack.

During automobile jacking procedures it is good practice to utilize blocks or wheel chocks to lock the tire diagonally opposite from the tire being changed from moving. Such wheel chocks are relatively inexpensive to manufacture and include a tire engaging surface for receiving a portion of the tire and a bottom side for engaging the ground and maintaining the wheel chock in engagement with the tire. However, because of inconvenience such chocks are usually not carried in the vehicle and, when needed, are not readily accessible and often are not utilized by the operator during the jacking procedures.

Loose wheel chocks in an automobile trunk are unsightly and troublesome, and, currently, automobile manufactures do not supply wheel chocks even in view of the improved safety they provide.

It is an object of the invention to provide a pair of wheel chocks adapted to be stowed in a vehicle directly in conjunction with a vehicle jack.

Another object of the invention is to provide a pair of wheel chocks which are adapted to support a vehicle jack and accessories during stowage in a vehicle and are easily removable to promote usage during jacking procedures for prohibiting movement of the vehicle.

A further object of the invention is to provide a combination vehicle jack and wheel chock system which is adapted to be sufficiently supported during stowage in a vehicle in a dependable and concise manner free of squeaks and rattles due to vibration.

Another object of the invention is to provide a pair of wheel chocks which incorporate a simple low cost construction including a tire engaging surface for prohibiting movement of a vehicle's tire during jacking procedures, a notch or recess for receiving and supporting a vehicle jack during stowage, and a bottom side having a pin receiving hole for releasably receiving a pin to anchor the chocks and jack system with respect to the vehicle.

In the practice of the invention a pair of wheel chocks are adapted to be utilized in conjunction with a standard scissor vehicle jack system for both supporting the jack during stowage in a vehicle and for blocking off a tire to prohibit movement of the vehicle during jacking procedures. The jack is of the standard scissors type including two pairs of arms pivotally mounted with respect to one another and to a pair of bases, and an accessory handle for transmitting torque to a threaded shaft to extend or retract the jack.

The chocks include a bottom side and a tire engaging surface extending from an edge adjacent the bottom side to a top edge. The top edge is provided with a recess or notch and the bottom side is provided with a hole adapted to releasably receive a pin extending from the vehicle during stowing.

During stowing, the chocks are positioned on the pins which are located at a predetermined spaced distance from one another in the trunk or rear end portion of the vehicle to maintain the chocks in opposed spaced relation. The jack and handle are located on the chocks such that the arms are received and supported in the recesses, and a strap is applied over the mid section of the jack and is secured to the deck of the vehicle by fastener portions to adequately support the jack and wheel chocks.

During jacking procedures, the strap is removed to permit the jack system and wheel chocks to be removed from the stowed location. The jack is positioned beneath the vehicle adjacent the tire being changed and the chocks are utilized to block off the diagonally opposite tire whereby the chocks are disposed on opposite sides of the tire to prohibit the vehicle from rolling in either direction.

The dual capability of the wheel chocks, in both use during stowing and jacking procedures, provides a convenient jack and wheel chock system which is adequately supported in the vehicle and promotes use of the wheel chocks during jacking procedures for purposes.

BRIEF DESCRIPTION OF THE DRAWINGS

The aforementioned objects and advantages of the invention will be appreciated from the following description and accompanying drawings wherein:

FIG. 1 is a perspective view illustrating the wheel chocks and a jack system in a typical application during jacking procedures of a vehicle, FIG. 2 is a perspective view of a wheel chock, per se, constructed in accord with the inventive concepts, FIG. 3 is an elevational, sectional view of a chock as taken along Section 3—3 of FIG. 2, FIG. 4 is a perspective view of the wheel chocks and jack system assembled for stowing, and FIG. 5 is a perspective view illustrating the jack and wheel chock assembly as stowed in a typical manner in the trunk of a vehicle.

DESCRIPTION OF THE PREFERRED EMBODIMENT

A pair of wheel chocks as used in the jack system incorporating the inventive concepts are illustrated in the drawings as generally indicated at 10 and 12. The chocks are adapted to be utilized in conjunction with a standard vehicle scissor jack and handle for both supporting the jack during stowage in a vehicle and for prohibiting movement of the vehicle during jacking procedures.

Referring to FIGS. 2 and 3, the wheel chocks include a back side 14, a bottom side 16, and an arcuate concave surface 18 which extends from a bottom edge 20 adjacent the side 16 to a top edge 22 adjacent the side 14. The surface 18 defines a tire engaging surface for receiving a portion of a vehicle's tire. The top edge 22 is provided with a recess or notch 24 which intersects the top region of the surface 18 and is adapted to releasably receive and support one end of a jack during stowing, and a hole 26 intersects the bottom side 16.

A typical vehicle jack adapted to be utilized in conjunction with the wheel chocks is generally indicated at 28, FIGS. 1, 4 and 5 and is of the standard scissors type. The jack 28 includes a pair of arms 30 and 32 which are pivotally mounted at one end to a common pad 34 and another pair of arms 36 and 38 which are pivotally mounted at one end to a common base 40. The other end of the arms 30 and 36 are pivotally at 42 and the other ends of the arms 32 and 38 are pivotally mounted at 44. Ends 42 and 44 receive an elongated threaded shaft 46 in the known manner. An accessory handle 48 permits the transmitting of torque to the shaft 46 in the desired direction to move the pad 34 and base 40 toward or away from each other to provide the necessary jacking action for lifting and lowering a vehicle as is well known.

Referring to FIG. 1, a typical application is illustrated in which the wheel chocks 10 and 12 and the jack 28 are utilized during jacking procedures for changing a tire on a vehicle generally indicated at 50 in dotted lines. The vehicle 50 includes front tires 52 and rear tires 54. In this particular application the left rear portion of the vehicle is being raised for changing the left rear tire 54 whereby the diagonally opposite tire, the right front tire, is blocked off with the wheel chocks. The wheel chocks 10 and 12 are disposed on opposite sides of the tire 52 whereby the tire engaging surfaces 18 engage a portion of the tire and the bottom sides 16 engage the ground, not shown, to maintain the chocks in engagement with the tire and prohibit the vehicle from rolling in either direction. Upon positioning the chocks, the jack is located between the frame of the vehicle, adjacent the left rear tire, and the ground and is actuated by transmitting torque to the shaft 46 with the handle 48 in the desired direction to elevate the vehicle in the manner well known.

During stowing, the jack 28 is adapted to be supported by the wheel chocks 10 and 12 as illustrated in FIGS. 4 and 5. In FIG. 4, a typical support surface or deck, such as a vehicle's trunk deck, is generally indicated at 56 and includes a pair of vertically extending and spaced locating pins 58 which are received in the chocks' holes 26 to maintain the chocks in opposed space relation. The jack 28 is fully collapsed and the handle 48 is strapped thereto with a strap 49, FIG. 4, which may be elastic. The jack is positioned on the chocks 10 and 12 such that the end of the jack's arms are received and supported by the notches 24. A strap 60 is applied over the mid-section of the jack and is affixed to the deck 56 by fastener portions at 62 to maintain the jack in firm engagement with the wheel chocks' notches 24, and the wheel chocks in position on the deck pins 58.

FIG. 5 illustrates the wheel chocks 10 and 12 and the jack 28 stowed in a vehicle's trunk 64. The combined jack and wheel chock system provides for minimal space requirement during stowage and adequate support to prevent the jack and chocks from rattling or moving about during transport. When necessary, the wheel chocks and jack are readily accessible as a package for use in jacking procedures simply by removing the strap 60. The proximity of the chocks to the jack promotes usage of the wheel chocks during jacking procedures for safety purposes. Proper support is achieved to eliminate squeaks and rattles due to vibration as the jack and accessories are supported away from the vehicle and is maintained tightly against the chocks.

The wheel chocks may be formed of various materials such as steel, aluminum, or molded of synthetic plastic. The particular construction of the wheel chocks may be altered to accommodate various types of jacks.

It is appreciated that various modifications to the inventive concepts may be apparent to those skilled in the art without departing from the spirit and scope of the invention.

I claim:

1. An automobile jack and wheel chocks assembly, comprising, in combination, a supporting deck, a pair of wheel chocks supported upon said deck in spaced relationship to each other, automobile jack receiving means defined on each of said chocks, an elongated automobile jack having end regions, said jack end regions being mounted within said jack receiving means for storage and being dismounted to enable said jack to raise an automobile wherein said automobile jack bridges said chocks, and a retainer mounted on said neck engaging said jack and biasing said jack toward said chocks and said chocks toward said deck.

2. A jack and wheel chocks assembly as in claim 1, locating means defined on said chocks and locating members defined on said deck engaging said locating means.

3. A jack and wheel chocks assembly as in claim 2, a bottom side defined on each of said chocks, said locating means comprising a hole defined in each chocks intersecting the associated bottom side and said locating member comprising a pin extending from said deck received within a hole.

4. An automobile jack and wheel chocks assembly for permitting an automobile jack and a pair of wheel chocks to be concisely stored and retained within an automobile, comprising, in combination, an automobile scissors jack comprising a plurality of pivotally interconnected arms mounted on a base having an elongated lowered configuration defined by spaced end regions, a pair of wheel chocks each having an upper edge, a lower echo supporting surface and a tire engaging surface located between said upper edge and said lower surface, a notch defined in each chock upper edge receiving one of said end regions of said jack whereby said jack is cradled in said chocks' notches and ridges said chocks, and retaining means maintaining said jack end regions within said chocks' notches upon said chocks being supported upon said chocks' supporting surfaces.

5. An automobile jack and wheel chock assembly as in claim 4, said retaining means comprising a strap, and chock locating means defined in said chocks' lower supporting surfaces.

* * * * *